Feb. 3, 1959    R. J. ROCKWELL    2,872,643
ELECTRICAL MEASURING INSTRUMENT
Filed May 7, 1956
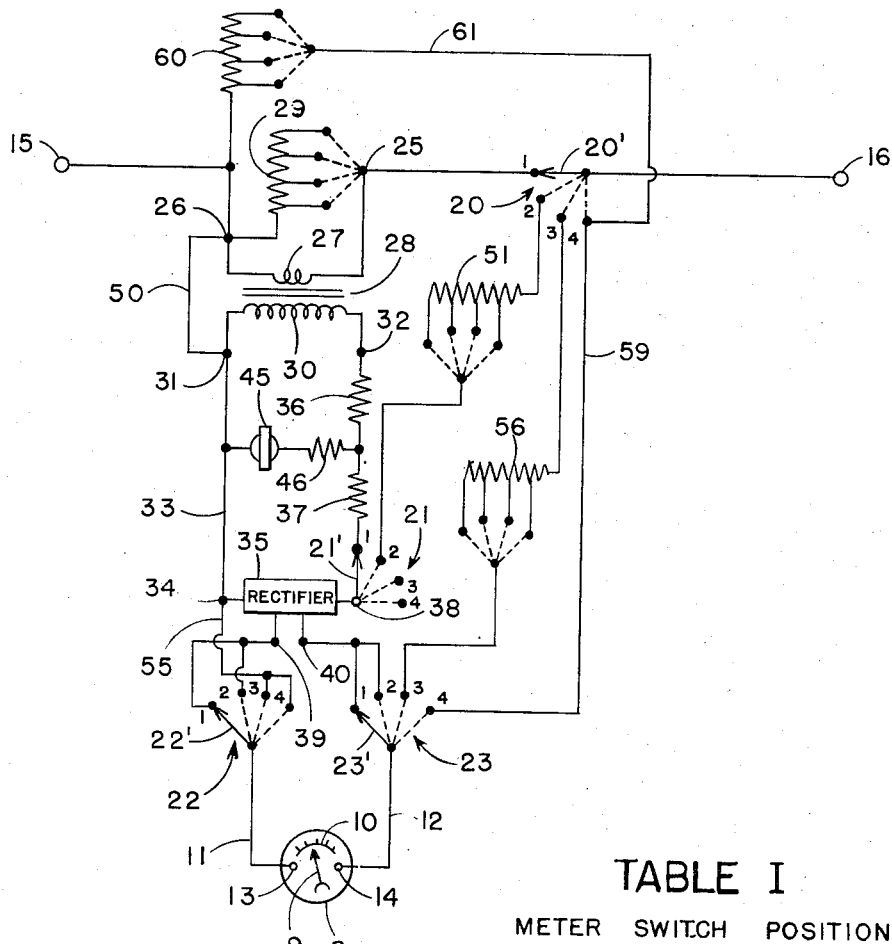
TABLE I
| METER | SWITCH | | POSITION | |
|---|---|---|---|---|
| | 20 | 21 | 22 | 23 |
| A-C AMPS. | 1 | 1 | 1 | 1 |
| A-C VOLTS | 2 | 2 | 2 | 2 |
| D-C VOLTS. | 3 | 3 | 3 | 3 |
| D-C AMPS. | 4 | 4 | 4 | 4 |
*INVENTOR.*
RONALD J. ROCKWELL.
*BY*
DES JARDINS, ROBINSON & KEISER.
*By Howard T. Keiser*
HIS ATTORNEYS.

United States Patent Office 2,872,643
Patented Feb. 3, 1959

2,872,643

ELECTRICAL MEASURING INSTRUMENT

Ronald J. Rockwell, Cincinnati, Ohio, assignor to Crosby Broadcasting Corporation, Cincinnati, Ohio, a corporation of Ohio Application May 7, 1956, Serial No. 582,991

1 Claim. (Cl. 324—119)

This invention relates to an electrical measuring instrument which features and is adapted to read A.-C. and D.-C. voltages and currents on a single, common linear scale thereby facilitating both the construction of the scale and also the reading of values therefrom.

The present invention is concerned with electrical measuring instruments employing a D'Arsonval, or permanent magnet, moving coil, type of meter movement. This type of movement is extremely sensitive but responds only to direct currents since the magnetic field in which the coil moves is created by permanent magnets and, therefore, unidirectional in nature. This type of movement can, however, be adapted for use in measuring A.-C. voltages and currents by employing a rectifier to convert the alternating current into direct current. In this way, the instrument is supplied with a pulsating D.-C. current but the instrument will give a steady deflection of the needle due to the inertia of the coil and needle system. Since this is a permanent magnet, moving coil type of movement, the reading provided thereby will be proportional to the average value of the current flowing through it. However, it is customary to graduate the meter scale in R. M. S. or effective values of a current of sinusoidal waveform and the instrument will provide correct readings so long as the measured current is also sinusoidal.

This rectifier type of instrument would provide a satisfactory A.-C. meter if an ideal rectifier could be provided which would present zero resistance to forward current and infinite resistance to reverse current with an instantaneous changeover in resistance at the point of reversal of current flow. Conventional rectifiers, however, depart considerably from this ideal form of operating characteristic and present considerable resistance to small values of forward current flow, the resistance increasing until the point of reversal is reached at which point the resistance may be very nearly equal to that presented by the rectifier to reverse current flow. For large currents, this is not important and the rectification ratio is good. However, for small currents, only a small portion of the curve is covered so that the resistance ratio and rectification ratio are poor. This phenomenon explains the crowding met in the lower part of the scale of low-range A.-C. instruments and also sets a limit to the sensitivity that can be obtained in microammeters and voltmeters. Because of the rectifier characteristics, these instruments work out to best advantage in medium and high-range voltmeters where the high series resistance swamps out the effective changes of the resistance. This permits the use of a linear scale for indicating A.-C. voltages thereon. In the case of microammeters and low-range milliammeters, the large series swamping resistance cannot be used and crowding therefore results at the lower portion of the scale with resultant loss in accuracy and need for specially constructed scales.

The present invention is concerned with means for eliminating this difficulty by compensating for the increased resistance presented by the rectifier to low current values so as to prevent crowding at the lower end of the scale and provide a substantially linear response of the meter to alternating currents applied thereto.

It is a further object of the present invention to provide a non-linear power-law device for compensating for the increased rectifier resistance at low current values in a multimeter type of measuring instrument so that A.-C. and D.-C. voltages and currents may be read from a single common linear scale.

With these and other objects in view, which will become apparent from the following description, the invention includes certain novel features of construction and combinations of parts, the essential elements of which are set forth in the appended claim and a preferred form or embodiment of which will hereinafter be described with reference to the drawing which accompanies and forms a part of this specification.

In the drawing, the figure shown is a diagrammatic view of a multimeter type of measuring instrument incorporating my invention.

As hereinbefore indicated, it is an essential feature of my invention to provide, in a multimeter type of electrical measuring instrument, a non-linear power-law compensating device connected in circuit with the rectifier so as to reduce the effect of the increased resistance presented by the rectifier at low current values and enable alternating current values to be read from the same linear scale as the other quantities which are adapted to be measured by the instrument. In the present embodiment of my invention I have shown a non-linear power-law resistance device as including an element having a negative resistance-versus-current characteristic; it is, of course, possible to utilize other non-linear devices for providing the necessary compensation for the non-linear rectifier. The particular element which I prefer to utilize for this purpose, is described in an article by K. B. McEachron entitled "Thyrite; a New Material for Lightning Arrestors" appearing in the General Electric Review for February 1930. This material is also the subject of U. S. Patent No. 1,822,742. As described in this article and also in the patent, a Thyrite element has a negative resistance-versus-current characteristic, that is, as the current flowing through the Thyrite element is increased, the resistance of the Thyrite element is decreased. The manner in which I make use of this characteristic of the Thyrite element will be more fully set forth hereinafter.

Referring to the drawing, reference numeral 8 denotes a meter having a permanet magnet, moving coil movement of low impedance and high sensitivity. Meter readings are provided by a needle 9 which moves across a linear scale 10. The meter has two terminals 13 and 14 and is connected into a multimeter type measuring circuit by leads 11 and 12 which are connected to terminals 13 and 14 of the meter. The measuring circuit is provided with a pair of input terminals 15 and 16 to which are applied the A.-C. or D.-C. voltages or currents which are to be measured by the instrument.

The instrument may be conditioned to measure any one of the four electrical quantities on the single, linear scale 10 by means of a four pole, four position switch which is desirably comprised of four sections 20, 21, 22 and 23 ganged together for conjoint movement. Each switch section is provided with a blade or rotor 20', 21', 22' or 23', respectively, and four contacts numbered 1, 2, 3 and 4 with which the rotors may selectively be brought into contact by suitable manipulation of a hand knob. Table I indicates the setting of the switch for measurement of each of the four electrical quantities to be measured by the instrument. In the drawing, the rotors are shown set on the #1 contact of each switch section which, as indicated in Table I, is the switch setting required for measuring A.-C. amps.

When the meter switch is set to read A.-C. amps., the terminals 15 and 16 are connected to terminals 25 and 26 of the primary winding 27 of a potential transformer 28. Shunted across the winding 27 is a multiple range shunt 29 comprised of a plurality of low resistance elements and means for selectively inserting them in the circuit. The transformer 28 is provided with a secondary winding 30 which contains at least ten times as many turns as the primary winding 27 so as to step up the voltage appearing across the primary winding. Hence, A.-C. current flowing between the terminals 15 and 16 will appear as an A.-C. voltage across terminals 31 and 32 of the secondary winding 30.

The terminal 31 is connected by a line 33 to one input terminal 34 of a full wave rectifier 35 which may be a copper-oxide instrument rectifier of conventional design. The terminal 32 of the secondary winding is connected through a pair of series connected resistors 36 and 37 to contact #1 of switch 21 which is connected by rotor 21' with a second input terminal 38 of the rectifier 35. The rectifier is provided with a pair of output terminals 39 and 40 which are connected to contact #1 of switch 22 and contact #1 of switch 23, respectively, which in turn are connected by rotors 22' and 23' with the meter leads 11 and 12. Accordingly, the A.-C. voltage appearing across the terminals 31 and 32 of the secondary winding 30 will be changed by rectifier 35 into a pulsating D.-C. current which traverses the moving coil of the meter 8 and provides an indication of A.-C. amps. on the scale 10.

To eliminate the non-linearity introduced by the rectifier 35 for low current values, and to enable the values of A.-C. current to be read on the same linear scale 10 as the other current and voltage values adapted to be indicated by the instrument, a non-linear element 45 is connected in shunt across the input to the rectifier 35. As shown in the drawing, this element, which preferably consists of Thyrite, is connected in shunt across the input to the rectifier 35. As shown, one terminal of the element 45 is connected to the line 33 while the other terminal thereof is connected through a resistor 46 of conventional type with the junction point between the resistors 36 and 37. The resistors 36, 37 and 46 are provided for the purpose of enabling the negative resistance versus-current characteristic of the Thyrite element 45 to be matched with the positive resistance versus-current characteristic of the rectifier 35 so as to provide a linear response of the meter 8 to voltages appearing across the terminals 31 and 32 of the secondary winding 30. It will be seen from the circuit that the resistors 36 and 46 will tend to counteract or offset a portion of the negative resistance versus-current characteristic of the Thyrite element 45, while the resistor 37 will act as a swamping resistance and thereby assist the Thyrite element in overcoming the changes in rectifier resistance at low current values. By suitable choice of values of resistors 36, 37 and 46 for a particular Thyrite element 45 and rectifier 35, a straight line linear response of the meter 8, to voltages appearing across the secondary winding of the transformer 28, is provided.

To measure A.-C. volts, the switch is manipulated to bring the four rotors thereof into contact with the #2 contacts whereby A.-C. voltage applied across the terminals 15 and 16 will be delivered directly to the input terminals 34 and 38 of the rectifier 35. The terminal 15 will now be connected directly to the terminal 34 through a line 50 which connects terminal 26 of the primary winding 27 to the terminal 31 of the secondary winding 30 which, in turn, is connected by the line 33 to the terminal 34. The terminal 16 will be connected to the terminal 38 of the rectifier through a multiplier 51 having resistance elements of suitable values for providing the desired A.-C. voltage ranges to be measured by the instrument. As previously indicated, the high series resistance provided by the multiplier 51 will swamp out any resistance changes occurring in the rectifier 35 so that no further compensation need be provided for causing the meter 8 to provide a linear response to the A.-C. voltages applied across the terminals 15 and 16.

To read D.-C. volts, the switch is manipulated to bring the four rotors thereof into engagement with the #3 contacts whereby the terminal 15 will be connected directly with the terminal 13 of the meter 8 by means of a line 55 connected between contact #3 of switch 22 and the input terminal 34 of the rectifier. At the same time, terminal 16 will be connected with the terminal 14 of the meter 8 through a multiplier 56 which is provided with suitable resistance values to provide the desired D.-C. voltage ranges to be read by the meter 8.

To read D.-C. amps., the switch is adjusted to bring the rotors into engagement with the #4 contacts which again results in terminal 15 being connected directly to terminal 13 of the meter through the line 55. At the same time, the terminal 16 will be connected to the terminal 14 of the meter through a line 59. In addition, a multiple range shunt 60 which is connected by a line 61 with contact #4 of switch section 20 will be placed in shunt across the terminals 15 and 16 to provide the desired D.-C. current ranges to be read by the meter 8.

From the foregoing description it will be observed that I have provided an instrument which will indicate A.-C. and D.-C. voltages and currents on a single, linear scale of a permanent magnet, moving coil meter thereby facilitating reading of values provided by the meter and eliminating the need for specially constructed non-linear scales for reading A.-C. amps. from the meter. Although I have described my invention in connection with one form or embodiment thereof and have used, therefore, certain specific terms and language herein, it is to be understood that the present disclosure is illustrative rather than restrictive and that changes and modifications may be resorted to without departing from the spirit of the invention or the scope of the claim which follows.

Having thus described my invention, what I claim as new and useful, and desire to secure by United States Letters Patent, is:

An instrument comprising: a single uniformly graduated scale for measuring alternating and direct current voltages; a permanent-magnet type meter movement having a moving coil and an indicating needle and two terminals; a pair of main input terminals adapted to be connected in series with the external circuit carrying the current to be measured; a transformer having a primary and a secondary; a direct conductive connection between one of said main input terminals and one side of said primary; a rectifier having a positive non-linear power-law resistance-versus-current characteristic and two rectifier input terminals and two rectifier output terminals, one of said rectifier input terminals being connected to one side of said secondary; a Thyrite impedance having a negative non-linear power-law resistance-versus-current characteristic and permanently conductively connected in shunt with said secondary; a first selective switching means comprising a moving contact, a first fixed contact connected to an output terminal of said rectifier, and a second contact connected to said one rectifier input terminal; a second selective switching means comprising a moving contact, a first fixed contact connected to the other output terminal of said rectifier and a second fixed contact; the two terminals of said meter movement being individually connected to the above-mentioned moving contacts; a third selective switching means comprising a moving contact connected to the remaining main input terminal, a first fixed contact connected to the other side of said primary, and a second fixed contact; a direct conductive connection between the second fixed contacts included in the second and third selective switching means; and a fourth selective switching means comprising a moving contact connected to the remaining input terminal of said rectifier and a first fixed contact connected to the other side of said secondary; said moving contacts being ganged to move in unison to an A.-C. amperes-measuring position, wherein all of the first fixed contacts and rectifier are active, or to a D.-C. amperes-measuring position, wherein all of the second fixed contacts are active and the first fixed contacts are inactive and the meter movement is connected directly to the main terminals; said rectifier and Thyrite impedance being so proportioned and arranged that their non-linear characteristics oppose each other.

References Cited in the file of this patent

UNITED STATES PATENTS

| | | |
|---|---|---|
| 1,811,319 | Johnson | June 23, 1931 |
| 1,959,592 | Macadie | May 22, 1934 |
| 2,165,836 | Buschbeck | July 11, 1939 |
| 2,167,162 | Terman | July 25, 1939 |
| 2,189,660 | Boudreau | Feb. 6, 1940 |
| 2,284,423 | Hansell | May 26, 1942 |
| 2,470,644 | Redman | May 17, 1949 |
| 2,521,254 | Rolfe | Sept. 5, 1950 |

OTHER REFERENCES

Publication: "Instrument Rectifiers" by H. B. Conant of the Conant Electrical Laboratories. Particularly pages 13, 14, 15, 16, 17, 18, 24, 25, and 26. Copyright 1945. (Copy in Patent Office Division 69.)

UNITED STATES PATENT OFFICE

CERTIFICATE OF CORRECTION

Patent No. 2,872,643                                February 3, 1959

Ronald J. Rockwell

It is hereby certified that error appears in the above numbered patent requiring correction and that the said Letters Patent should read as corrected below.

In the grant, lines 2 and 12, and in the heading to the printed specification, lines 3 and 4, name of assignee, for "Crosby Broadcasting Corporation", each occurrence, read -- Crosley Broadcasting Corporation --; column 4, line 60, before "contact" insert -- fixed --.

Signed and sealed this 9th day of June 1959.

(SEAL)
Attest:

KARL H. AXLINE
Attesting Officer

ROBERT C. WATSON
Commissioner of Patents